US012106645B2

(12) United States Patent
Chen et al.

(10) Patent No.: US 12,106,645 B2
(45) Date of Patent: Oct. 1, 2024

(54) BATCH SIZE ADJUSTMENT USING LATENCY-CRITICAL EVENT RECOGNITION

(71) Applicant: Google LLC, Mountain View, CA (US)

(72) Inventors: Yu-sheng Chen, Dublin, CA (US); Matthew Wagner, Mountain View, CA (US)

(73) Assignee: Google LLC, Mountain View, CA (US)

( * ) Notice: Subject to any disclaimer, the term of this patent is extended or adjusted under 35 U.S.C. 154(b) by 153 days.

(21) Appl. No.: 17/568,439

(22) Filed: Jan. 4, 2022

(65) Prior Publication Data

US 2023/0215255 A1 Jul. 6, 2023

(51) Int. Cl.
*G08B 13/19* (2006.01)
*G08B 13/196* (2006.01)

(52) U.S. Cl.
CPC . *G08B 13/19667* (2013.01); *G08B 13/19613* (2013.01); *G08B 13/19669* (2013.01); *G08B 13/19676* (2013.01)

(58) Field of Classification Search
USPC .......................................................... 348/143
See application file for complete search history.

(56) References Cited

U.S. PATENT DOCUMENTS

| | | | | |
|---|---|---|---|---|
| 8,296,410 | B1 * | 10/2012 | Myhill | G06F 11/1464 709/223 |
| 9,807,301 | B1 * | 10/2017 | Weisberg | H04N 23/64 |
| 10,257,475 | B2 | 4/2019 | Modestine et al. | |
| 10,803,719 | B1 * | 10/2020 | Skeoch | H02M 7/064 |
| 11,232,685 | B1 * | 1/2022 | Nixon | H04N 23/60 |
| 2007/0081587 | A1 * | 4/2007 | Raveendran | H04N 19/147 375/240.1 |
| 2012/0169842 | A1 * | 7/2012 | Chuang | H04N 7/181 348/E7.001 |
| 2015/0341549 | A1 * | 11/2015 | Petrescu | H04N 23/64 348/207.1 |
| 2016/0277759 | A1 * | 9/2016 | Edpalm | G08B 25/08 |

(Continued)

FOREIGN PATENT DOCUMENTS

| | | |
|---|---|---|
| EP | 3070695 | 6/2017 |

OTHER PUBLICATIONS

Zhang, et al., "A Fast Filtering Mechanism to Improve Efficiency of Large-Scale Video Analytics", Jun. 2020, pp. 914-928.

(Continued)

*Primary Examiner* — Nigar Chowdhury
(74) *Attorney, Agent, or Firm* — Colby Nipper PLLC

(57) ABSTRACT

This document describes techniques, apparatuses, and systems for batch size adjustment using latency-critical event recognition. The techniques described herein enable an electronic device (e.g., security camera) to determine the likelihood of an event of interest (e.g., latency-critical event) occurring in data (e.g., audio and/or video) captured by the electronic device. To make such a determination, the electronic device may switch upload modes to upload the data, using a different batch size to reduce latency, to another device for user access, based on the likelihood of an event of interest occurring in the data. In this way, the techniques, apparatuses, and systems for batch size adjustment using latency-critical event recognition provide an efficient way to provide all-day security monitoring.

20 Claims, 6 Drawing Sheets

(56) References Cited

U.S. PATENT DOCUMENTS

| | | | | |
|---|---|---|---|---|
| 2017/0371329 | A1* | 12/2017 | Giering | G05B 23/0294 |
| 2018/0157231 | A1* | 6/2018 | Bogdan | G05B 19/042 |
| 2018/0159593 | A1* | 6/2018 | Bogdan | H04L 12/4625 |
| 2018/0159595 | A1* | 6/2018 | Johnson | H01P 5/103 |
| 2018/0324479 | A1* | 11/2018 | Cho | H04N 21/26241 |
| 2018/0336479 | A1* | 11/2018 | Guttmann | G06V 10/764 |
| 2019/0020827 | A1* | 1/2019 | Siminoff | G08B 13/19667 |
| 2019/0057259 | A1* | 2/2019 | Laska | H04W 12/06 |
| 2021/0149441 | A1* | 5/2021 | Bartscherer | G06F 1/1616 |
| 2021/0383129 | A1* | 12/2021 | Rosenberg | G06F 18/22 |
| 2021/0407237 | A1* | 12/2021 | Khalid | G07C 9/00563 |
| 2022/0036420 | A1* | 2/2022 | Lee | G06Q 30/0631 |
| 2023/0209021 | A1* | 6/2023 | Wu | H04N 7/18 348/143 |

OTHER PUBLICATIONS

"International Search Report and Written Opinion", Application No. PCT/US2022/081295, Mar. 14, 2023, 11 pages.
"International Preliminary Report on Patentability", Application No. PCT/US2022/081295, Jun. 20, 2024, 8 pages.

* cited by examiner

BATCH SIZE ADJUSTMENT USING LATENCY-CRITICAL EVENT RECOGNITION

BACKGROUND

Integrated smart devices are continuing to become more prevalent in the modern home to increase security and connectivity. With many devices operating within a smart home system, each device may serve a specific purpose that is only relevant for a small percentage of time. Security cameras, for example, may record an empty room or driveway for all but a few hours of a single day. To appropriately record the critical hours, however, security cameras may operate in a resource-intensive state at all times. As a result, smart homes may largely operate in an unoptimized fashion that requires unnecessary resources being dedicated to a certain device thereby consuming excess power and communication bandwidth.

SUMMARY

This document describes techniques, apparatuses, and systems for batch size adjustment using latency-critical event recognition. The techniques described herein enable an electronic device (e.g., security camera) to determine the likelihood of an event of interest (e.g., latency-critical event) occurring in data (e.g., audio and/or video) captured by the electronic device. To make such a determination, the electronic device may switch upload modes to upload the data, using a different batch size to reduce latency, to another device for user access, based on the likelihood of an event of interest occurring in the data. In this way, the techniques, apparatuses, and systems for batch size adjustment using latency-critical event recognition provide an efficient way to provide all-day security monitoring.

In aspects, a sensor of an electronic device captures a stream of data, and a first portion of the stream of data is uploaded using a first upload mode having a first batch size. Characteristics associated with data from the first portion of the stream of data may be determined. In response to determining the characteristics associated with the data from the first portion of the stream of data, the electronic device may switch from the first upload mode to a second upload mode having a second batch size different from the first batch size. After switching to the second upload mode, a second portion of the stream of data may be uploaded using the second upload mode.

Implementations exist where batch size adjustment using latency-critical event recognition is performed by an electronic device including a sensor, at least one processor, and computer-readable storage media storing computer-executable instructions that, when executed by the at least one processor, perform the described methods. In some implementations, determining the event likelihood may be further based on sensor data received from a different sensor device communicatively coupled to the electronic device. In one example, the electronic device and the different sensor device may be associated with a smart home system. For example, the electronic device or the different sensor device may be an indoor security camera, an outdoor security camera, or a doorbell camera communicatively coupled to a smart home system.

This Summary is provided to introduce simplified concepts of techniques, apparatuses, and systems for batch size adjustment using latency-critical event recognition, the concepts of which are further described below in the Detailed Description and Drawings. This Summary is not intended to identify essential features of the claimed subject matter, nor is it intended for use in determining the scope of the claimed subject matter.

BRIEF DESCRIPTION OF THE DRAWINGS

The details of one or more aspects of batch size adjustment using latency-critical event recognition are described below. The use of the same reference numbers in different instances in the description and the figures indicate similar elements.

DETAILED DESCRIPTION

Overview

Figure 1:
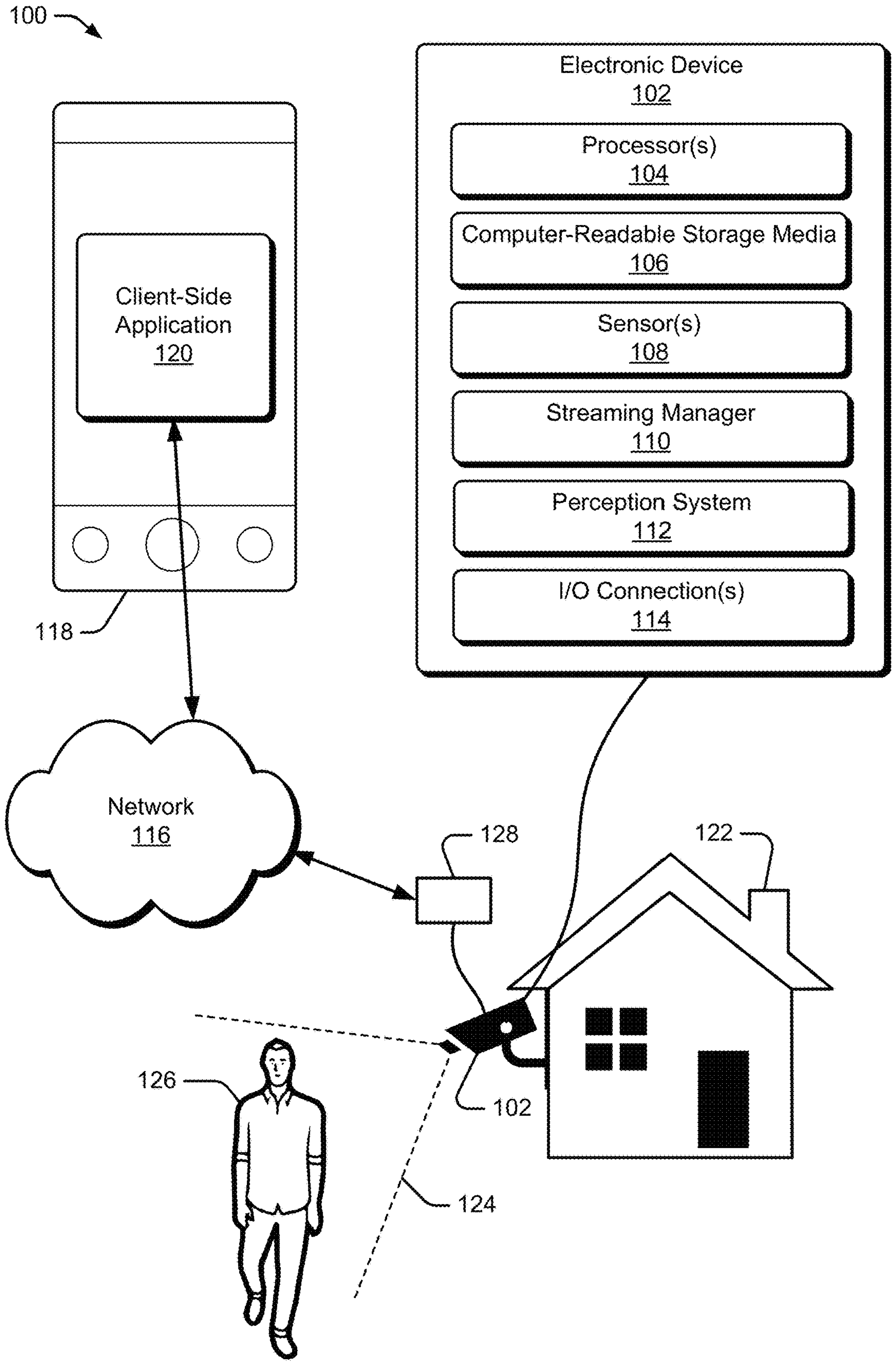
FIG. 1 illustrates an example operating environment for batch size adjustment using latency-critical event recognition.

This document describes techniques, apparatuses, and systems for batch size adjustment using latency-critical event recognition. In modern homes, smart security cameras are used to enable users to monitor their home and ensure the security of their belongings even when located miles away. To this effect, many security cameras offer constant video/audio recording that enables users to stream content recorded by the security camera at any time during the day or night. In general, a security camera may spend a majority of the time recording events irrelevant to home security where latency is noncritical to a user streaming the captured video, for example, an empty driveway, trees moving in the wind, a dog standing up to get water, etc. However, during small portions of the day, events may occur that have sufficient relevance to the user such that the user may desire to stream the video captured by the security camera in real-time or near real-time.

Low latency and power consumption, however, generally conflict with one another. Specifically, batch size can affect the latency of data uploaded to a network. For example, when a smaller batch size is used, the latency in uploading a stream of data is reduced. Using a smaller batch size, however, may require that a chip used to upload the batch, for example, a WiFi chip, be forced to be on for a greater percentage of time. For example, the WiFi chip may upload the batch with a larger size that enables the chip to operate for a longer duration of each transmission with a smaller duty cycle. As a result, the security camera may use more power and generate more heat.

The above-described problems can be solved by increasing the batch size. Specifically, at a larger batch size, the chip may enter a sleep state while not being used to upload the batch. For example, the stream of data may be held in a buffer until the batch size is reached. When the batch size is reached, the data held in the buffer may be uploaded as a batch. While the buffer is being filled, the chip may enter an idle mode until upload is required. With a larger batch size, the chip may spend more time in a sleep state as opposed to an active state. In reducing the time that the chirp is in an active state by using the larger batch size, power and heat may be reduced while simultaneously increasing WiFi efficiency. As a result of using the larger batch size, however, the latency may be increased as data are generally not uploaded until the batch size is reached. Thus, during latency-critical events, the larger batch size may be suboptimal for streaming data to the user.

Consequently, a conventional single upload mode does not solve the respective challenges arising from both latency-critical and latency-noncritical events. Specifically, a larger batch size is detrimental to the requirements of latency-critical events while a smaller batch size is unnecessary for latency-noncritical events. Accordingly, it may be beneficial to enable dynamic batch size adjustment based on a determination of a likelihood that the data being recorded correspond to a latency-critical event. To enable dynamic batch size adjustment, the present disclosure describes batch size adjustment using latency-critical event recognition. In aspects, the likelihood of a latency-critical event occurring in an image recorded by the security camera is determined. When a high likelihood of a latency-critical event is determined, the security camera may upload data with a smaller batch size to minimize latency. In contrast, when a low likelihood of a latency-critical event is determined, the security camera may upload data with a larger batch size to minimize power usage and heat generation and maximize WiFi efficiency. It should be noted that these are but a few example aspects of batch size adjustment using latency-critical event recognition, others of which are described throughout this disclosure and illustrated in the accompanying figures.

Example Operating Environment

FIG. 1 illustrates an example operating environment 100 of batch size adjustment using latency-critical event recognition. The operating environment 100 illustrates an electronic device 102 including a processor 104, a computer-readable storage media (CRM) 106, one or more sensors 108, a streaming manager 110, a perception system 112, and one or more input/output (I/O) connections 114. The electronic device 102 may communicate via a network 116 to a client-side device 118 executing a client-side application 120. The electronic device 102 may reside within or around a house 122 and capture a field of view 124 capturing, for example, the actions of a person 126.

The house 122 may include various integrated devices in addition to the electronic device 102. Though illustrated as the house 122, it should be appreciated that the various devices may be integrated into any number of constructions, for example, an office building, a garage, a mobile home, an apartment, a condominium, an office, a wall, a fence, a pole (e.g., streetlamp pole, traffic light pole), and the like. Moreover, the various devices may be integrated in the house 122 as external or internal devices. For example, as illustrated, an electronic device 102 is fixedly attached to the exterior of the house 122. In other implementations, the electronic device 102 may be located within the interior of the house 122. As illustrated, the electronic device 102 is a smart security camera that includes image sensors that collect image data in a field of view 124. In this implementation, a person 126 is present in the field of view 124 and the electronic device 102 collects images of the person 126 while they are located in the field of view 124. The electronic device 102 may collect continuous video of the field of view 124 regardless of the presence of the person 126, objects, or other elements within the field of view 124.

Though illustrated as an exterior security camera, the electronic device 102 may include any number of suitable devices, for example, an interior security camera, smart doorbell, smart door lock, mobile device, laptop, desktop, and the like). The smart doorbell or the smart door lock may detect a person's approach to or departure from a location (e.g., an outer door).

The electronic device 102 contains at least one processor 104 that executes computer-executable instructions stored on the computer-readable storage media (CRM 106). Examples of the processor 104 includes, but is not limited to, a system-on-chip (SoC), an application processor (AP), a central processing unit (CPU), microprocessor, microcontroller, controller, or a graphics processing unit (GPU).

The CRM 106 may be implemented within or in association with the processor 104, for example, as an SoC or other form of an internal or embedded system that provides processing or functionalities of the electronic device 102. Alternatively, the CRM 106 may be external but associated with the processor 104. The CRM 106 may include volatile memory or non-volatile memory, which may include any suitable type, combination, or number of internal or external memory devices. Each memory of the CRM 106 may be implemented as an on-chip memory of hardware circuitry or an off-chip memory device that communicates data with the processor 104 via a data interface or bus. In one example, volatile memory includes random access memory (RAM). Alternatively, or additionally, volatile memory may include other types of memory, such as static random access memory (SRAM), synchronous dynamic random access memory (DRAM), asynchronous DRAM, double-data-rate RAM (DDR). Nonvolatile memory may include, but is not limited to, flash memory, read-only memory (ROM), and one-time programmable (OTP) memory, non-volatile RAM (NVRAM), electronically-erasable programmable ROM, embedded multimedia card (eMMC) devices, single-level cell (SLC) flash memory, multi-level cell (MLC) flash memory, and the like.

The electronic device 102 includes sensors 108 that can be used to collect data about the environment surrounding the electronic device 102. Some nonlimiting examples of sensors 108 include (e.g., infrared (IR) sensors, red-green-blue (RGB) sensors, motion detectors, keypads, biometric scanners, near-field communication (NFC) transceivers, microphones, etc.). In some implementations, the electronic device 102 contains image sensors that are used to capture image data in the field of view 124. The captured sensor data may be stored in the CRM 106, acted on by the processor 104, or output through input/output (I/O) connections 114.

I/O connections 114 may enable the electronic device 102 to interact with other devices or users, such as the programming of code or values described herein to respective memories, registers, and so forth. I/O connections 114 may include any combination of internal or external ports, such as a USB port, Ethernet port, Joint Test Action Group (JTAG) port, Test Access and Programming (TAP) port, audio ports, Serial ATA (SATA) ports, PCI-express based ports or card-slots, secure digital input/output (SDIO) slot, and/or other legacy ports. Various peripherals may be operatively coupled with I/O connections 114, such as human-input devices (HIDs), external CRM, or other peripherals.

The I/O connections 114 may additionally include wireless connections that interact wirelessly with other users and devices over a network 116, for example, the Internet. In aspects, the communications may be carried out using any of a variety of custom or standard wireless protocols (e.g., IEEE 802.15.4, Wi-Fi®, ZigBee®, 6LoWPAN®, Thread®, Z-Wave®, Bluetooth® Smart, ISA100.11a™, WirelessHART®, MiWi™, etc.). In some implementations, data communications are conducted peer-to-peer (e.g., by establishing direct wireless communications channels between devices). In some implementations, a first one of the devices communicates with a second one of the devices via a wireless router. Through the network 116, the smart devices may communicate with a smart home provider server system (e.g., a remote server).

In aspects, the electronic device 102 is communicatively coupled to a user device 118 through the network 116. It should be noted that the user device 118 may be internal or external to the house 122 and located any distance from the electronic device 102. Nonlimiting examples of the user device 118 include mobile devices, laptops, desktops, vehicle, and wearable devices (e.g., smart watches, smart glasses, etc.). The user device 118 may include a client-side application 120 that operates in communication with the electronic device 102. For example, the client-side application 120 may include a smart home application programming interface (API). In one example, the client-side application 120 may enable a user of the user device 118 to stream images captured by the electronic device 102 through the network 116.

The electronic device 102 may include any number of modules stored in the CRM 106 to enable performance of different functions. For example, the electronic device 102 may include a perception system 112 implemented within the CRM 106. The perception system 112 may be implemented within one or more storage devices internal to the electronic device 102 or external but coupled to the electronic device 102. In aspects, the perception system 112 is executed by the processor 104 to perform latency-critical event detection within the images collected by the sensors 108. For example, the perception system 112 may determine a high likelihood or a low likelihood of a latency-critical event occurring within one or more images collected by or about to be captured by the sensors 108. In some implementations, the perception system 112 may use motion detected within the images to determine the event likelihood. Alternatively, or in addition, the perception system 112 may use sound, identity detection (e.g., facial detection), object detection, or any other appropriate method.

In aspects, the perception system 112 may utilize data from other devices to determine the event likelihood of a latency-critical event in the one or more images. For example, the perception system 112 may utilize data collected from a different sensor device communicatively coupled to the electronic device 102 through the I/O connections 114. For example, the different sensor device and the electronic device 102 may be associated with a smart home system within the house 122. The different sensor device may be any suitable electronic device including, for example, one of the above-described examples of the electronic device 102, a smart thermostat, a hazard detection unit, an occupancy detection device, a door lock, a microphone, an alarm system, a smart wall switch, a smart wall plug, a smart appliance, a hub device, and so forth. In some implementations, the different sensor device may monitor a different area than the electronic device 102. In other implementations the different sensor device monitors the same area as the electronic device 102. The different sensor device may communicate, to the electronic device 102, sensor data collected by the different sensor device that the perception system 112 may use to determine the likelihood of a latency-critical in the images captured or about to be captured by the electronic device 102. For example, the different sensor may indicate a high likelihood that a latency-critical event is occurring in a spatially adjacent area to the area monitored by the electronic device 102 and, as a result, the perception system 112 may determine a high event likelihood in the images captured or about to be captured by the electronic device 102.

The perception system 112 may provide the event likelihood to a streaming manager 110. The streaming manager 110 may be implemented in the CRM 106 through one or more devices internal or external to the electronic device 102. Moreover, the streaming manager 110 may be executed by the processor 104 to manage the upload of the stream of images collected by the sensors 108 to the network 116. The streaming manager 110 may receive the event likelihood from the perception system 112 and compare it to a predetermined event likelihood threshold. The streaming manager 110 may operate in a different mode based on the comparison. For example, if the event likelihood is greater than or equal to the predetermined event likelihood threshold, then the streaming manager 110 may upload the one or more images captured by the electronic device 102 using a first upload mode having a small batch size. In another example, if the event likelihood is less than the predetermined event likelihood threshold, the streaming manager may upload the one or more images captured by the electronic device 102 using a second upload mode having a larger batch size than the previously described upload mode.

In aspects, the upload modes may utilize a buffer 128 (e.g., video buffer, audio buffer) that maintains the images collected by the electronic device 102 until the buffer 128 reaches a particular batch size or duration. The streaming manager 110 may upload the images maintained in the buffer 128 in accordance with the applied upload mode such that the images are uploaded in response to the buffer 128 reaches the batch size defined by the upload mode. The batch size may be represented by a total data size of the buffer or a duration for which the buffer 128 has held images since the last upload. In one example, the latency-critical mode defines a batch size equal to the frame rate, which enables the images to be uploaded immediately upon capture. In another example, the latency-critical upload mode defines a batch size of 100 milliseconds (ms), which enables the images to be uploaded at a rate that is near real-time and/or perceived by the user as real-time.

In some instances, the streaming manager 110 may operate in a latency-noncritical mode using a large batch size. In an example, the perception system 112 determines a high event likelihood, which triggers the streaming manager 110 to switch from a latency-noncritical mode to a latency-critical mode using a smaller batch size. The high event likelihood may be determined at a time where the buffer maintains images and has a current batch size that has not yet reached the batch size associated with the latency-noncritical mode. In some implementations, the streaming manager 110 may upload the images in the buffer with the current batch size to avoid further latency in the subsequent images where a high event likelihood has been determined (e.g., the latency-critical case). As such, the streaming manager 110 may handle switching between latency-critical and latency-noncritical upload modes.

Example Systems

Figure 2:
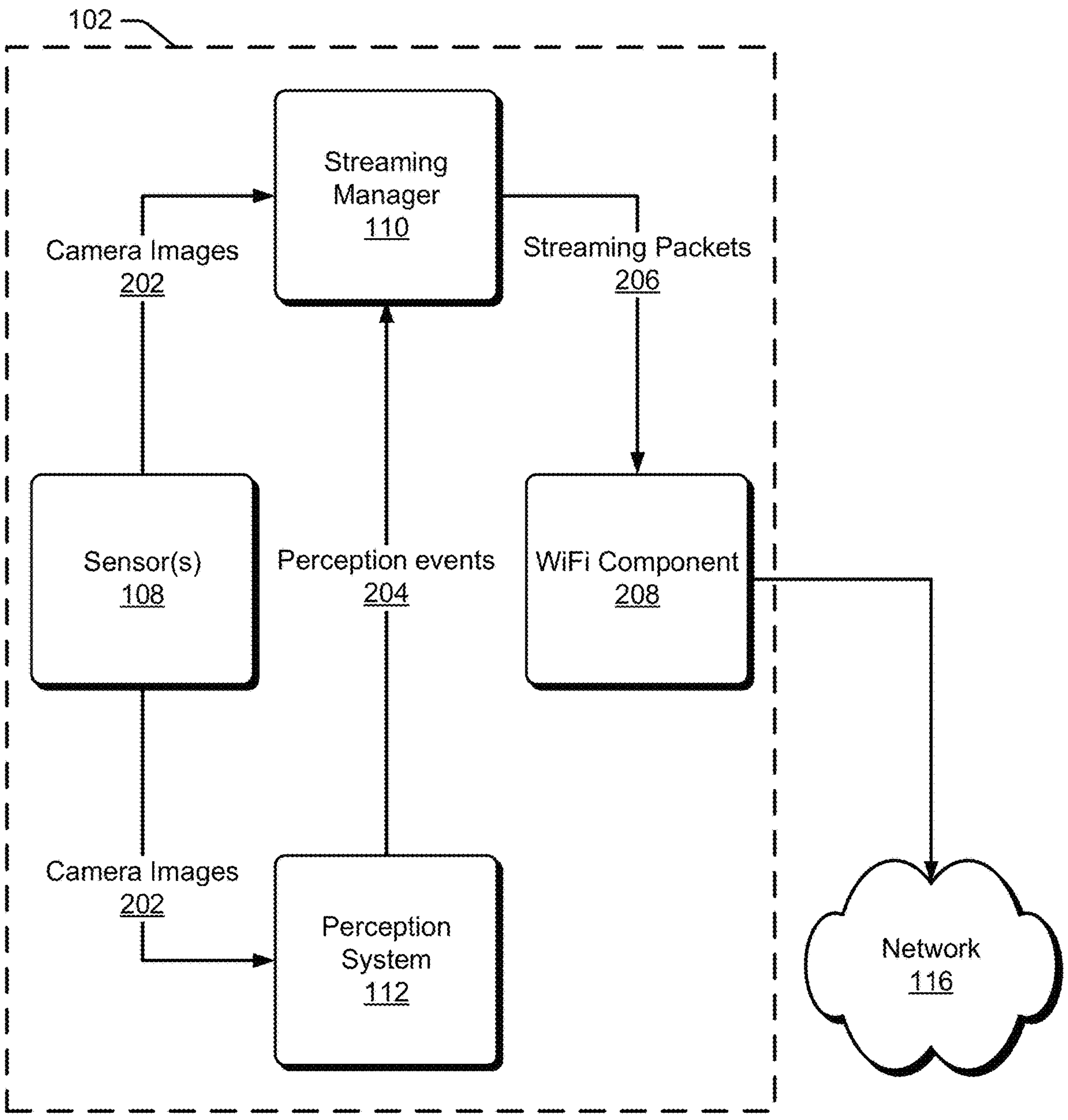
FIG. 2 illustrates an example flow chart of an electronic device performing batch size adjustment using latency-critical event recognition.

FIG. 2 illustrates an example flow chart of an electronic device 102 performing batch size adjustment using latency-critical event recognition. As illustrated, the electronic device 102 uses the sensors 108 (e.g., image sensor) to capture camera images 202. The camera images 202 may include video and/or audio data representative of the field of view 124 of the sensors 108 at a moment in time. In some implementations, the camera images 202 may be a continuous stream of data or metadata recorded by the sensors 108. As such, the batch size adjustment may not be limited to audio or video images but may be implemented with any multimedia or continuous stream of data. The camera images 202 may be provided to the perception system 112 and/or the streaming manager 110. In an aspect, the sensors 108 collect a stream of images and as the images are collected, they are provided to the perception system 112 and/or the streaming manager 110.

The perception system 112 may utilize the camera images 202 to determine characteristics associated with the camera images 202. For example, the perception system 112 may identify motion within the camera images 202 and, as a result, determine a high event likelihood. In some implementations the perception system 112 may utilize identification to determine the event likelihood. For example, the perception system 112 may identify a person within the camera images 202 and based on the identity of the person, determine the event likelihood. In a specific example, a homeowner or resident of the house may be identified and the perception system 112 may determine a low event likelihood, as the identified person is authorized to be in the house. In aspects, the electronic device 102 may be associated with a smart home system having registered household members or users. In another example, a child or infant of the house may be identified, and the perception system 112 may indicate a high event likelihood, as the camera images 202 may be used to monitor or ensure the safety of the child. In yet another example, a nonresident of the house may be identified, or not identified, and, as a result, the perception system 112 may determine a high event likelihood, as there is a higher chance the person in not authorized to be in the house.

In aspects, the perception system 112 may use audio to determine the event likelihood. For example, when applied to the situation above, a recognized voice may help the perception system 112 identify a person within the images 202. Alternatively, an unrecognized voice may indicate that an unwelcome person is in or near the house. In one example, the amplitude of audio may be considered where loud volumes increase the event likelihood.

In some implementations, the perception system 112 may use object detection to determine the event likelihood. For example, the perception system 112 may search the camera images 202 for objects that are typically not present in the camera images 202. If such objects are determined, the perception system 112 may determine a high event likelihood, as an event relevant to security may be occurring. Alternatively, or in addition, the perception system 112 may identify objects of interest in the camera images 202. For example, the user associated with the electronic device 102 may have a specific object that they wish to have monitored for security or any other reason, such as a package that is to be delivered or picked up. Accordingly, the perception system 112 may determine a high event likelihood when one or more objects of interest are identified. It should be appreciated that these are but some of the many ways to determine the likelihood of a latency-critical event occurring and other examples may be utilized that do not extend beyond the applicability of this disclosure.

Although not illustrated, sensor data may be received by the electronic device 102 from different sensor devices, and the sensor data may be used by the perception system 112 to determine the event likelihood. For example, any number of different sensor devices may provide data to the perception system 112, as described in FIG. 1. The sensor data may include data pertaining to image data, audio data, motion detection, object identification, person identification, occupancy information, and the like. The different sensor devices may be located distant from or in close proximity to the electronic device 102. For example, the different sensor device may be in a room adjacent to the electronic device 102. Moreover, the different sensor device may monitor a same or different area than the electronic device 102.

In some implementations, the camera images 202 may provide information about future images to be collected by the sensors 108 that is used to determine the event likelihood. For example, characteristics determined in the camera images 202 may determine that latency-critical events are likely to be captured in future images. As such, there may be buffer time (e.g., in the order of seconds) that enables the upload mode to switch before the latency-critical event begins. In this manner, the perception system 112 may be able to determine a high event likelihood from the camera images 202 to enable future images with latency-critical events to be uploaded with reduced latency. As a result, latency-critical events may be captured from their beginning with reduced latency. For example, the camera images 202 may include a shadow, which may indicate a high likelihood that a person will appear in subsequent images, particularly if the shadow increases in size over a series of images of the camera images 202. As such, the perception system 112 may provide a higher event likelihood.

In another example, the camera images 202 may indicate that a similar motion is present in a series of previous images, for example, a tree moving in the wind. This may enable the perception system 112 to respond appropriately to movement in subsequent images. In this manner, the perception system 112 may determine event likelihood dynamically based on changes between the camera images 202. Likewise, the sensor data from different sensor devices may be used to determine the event likelihood in future images. For example, a different sensor device located adjacent to the electronic device 102 may detect the presence of a person or object, which may indicate a greater likelihood of a latency-critical event occurring in the upcoming images to be captured by the electronic device 102. As such, the perception system 112 may determine a high event likelihood.

In aspects, the perception system 112 may act in response to actuation of the electronic device 102 or the different sensor device. In the case of a smart doorbell or smart lock, for example, a person may actuate the doorbell or smart lock. As a result, sensors 108 (e.g., imaging sensors) associated with the doorbell or smart lock, or a communicatively coupled device, may have a high likelihood of detecting and/or capturing latency-critical events. As such, the perception system 112 may determine a high event likelihood.

The event likelihood may be provided to the streaming manager 110 as perception events 204. The perception events 204 may include an indication of the likelihood of a latency-critical event in the current images and/or in future images. The perception events 204 may be represented as a single numerical value that indicates the event likelihood, including e.g., a value in the range of one to ten. In other implementations, the perception events 204 may be provided as specific events that are indicated as latency-critical events. If the perception events 204 are greater than a threshold (e.g., a sufficient number of latency-critical events are determined or a sufficiently large numerical value is determined), the streaming manager 110 may upload the camera images 202 and/or one or more future images in a latency-critical mode. Otherwise, the streaming manager 110 may upload the camera images 202 and/or one or more future images in a latency-noncritical mode.

For example, the sensors 108 provide the camera images 202 to the streaming manager 110. Based on the perception events 204 provided by the perception system 112, the streaming manager 110 may upload the camera images 202 in an appropriate manner (e.g., upload mode). In some implementations, the upload mode for the camera images 202 may be based on perception events determined from previous camera images. As a result, the future camera images may be uploaded using an appropriate mode (e.g., latency-critical or latency-noncritical) based on the detected events occurring in the previous camera images. In one example, the streaming manager 110 operates in one of two modes: a latency-critical mode or a latency-noncritical mode. In other examples, the streaming manager 110 may have more than two modes based on the event likelihood (e.g., perception events 204). In aspects, the characteristics associated with the latency-critical mode or the latency-noncritical mode may be adjusted over the lifespan of the electronic device 102. For example, the batch size in the latency-critical mode or the batch size in the latency-noncritical mode may not be constant across the lifespan of the electronic device 102. In other implementations, the batch size associated with the latency-critical mode and the batch-size associated with the latency-noncritical mode are constant across the lifespan of the electronic device. Moreover, these batch sizes may be predetermined, e.g., defined during manufacturing and before the electronic device 102 is put into operation.

In each mode, the streaming manager 110 produces streaming packets 206 using the camera images 202. The characteristics of the streaming packets 206 may vary based on the upload mode. In an example, the streaming manager 110 may utilize a video buffer (e.g., buffer 128) to maintain the camera images 202 until the video buffer reaches the specific batch size defined by the current upload mode. Once the video buffer reaches the appropriate batch size, the camera images 202 maintained in the video buffer may be uploaded as the streaming packets 206. In an aspect, each of the streaming packets 206 corresponds to a batch of the camera images 202.

The streaming manager 110 may determine that a switch is required from a latency-noncritical mode to a latency-critical mode. In some instances, the video buffer maintains images from the camera images 202 and have a current batch size less that the appropriate batch size for the latency-noncritical mode. In these situations, if the streaming manager waits until the video buffer reaches the appropriate batch size, a latency-critical event may be captured with high latency (e.g., close to or greater than 0.5 seconds). To reduce the latency in such circumstances, the streaming manager 110 may smoothly handle switching from a latency-noncritical mode to a latency-critical mode. For example, the streaming manager 110 may upload the images maintained in the buffer with the current batch size, regardless of the current batch size being a different size than the batch size defined by the current upload mode. In aspects, the images may be provided to a WiFi component 208 as the streaming packets 206.

The WiFi component 208 receives the streaming packets 206 and uploads them to the network 116. The WiFi component 208 may include a WiFi chip (e.g., processor) that executes the operations of the WiFi component 208. The WiFi chip may be separate from or integrated in the at least one processor of the electronic device 102 (e.g., processor 104). The WiFi chip may include power saving optimization that enables the chip to transition from an active state, where the chip is operating, and a sleep state, where the chip is idle. In the sleep state, the chip may generate less heat and utilize less power. In some implementations, the chip may have a wait time defined as the time to transition from the active state to the sleep state. The wait time may be, for example, 200 ms, 220 ms, 250 ms, 300 ms, and so forth. In some implementations, the chip may transition to a sleep state when no upload is needed. As such, less frequent uploads (e.g., larger batch sizes) may enable for greater time operating in the sleep state (e.g., decreased power consumption and heat generation). In addition, increasing batch size may reduce the transmitting (TX) packet overhead. As a result, the lower TX packet overhead may imply a lower TX duty cycle and less WiFi airtime, thus improving WiFi efficiency. In aspects, each of the streaming packets 206 is uploaded when the buffer reaches the appropriate batch size or when the next of the streaming packets arrives.

Figure 3:
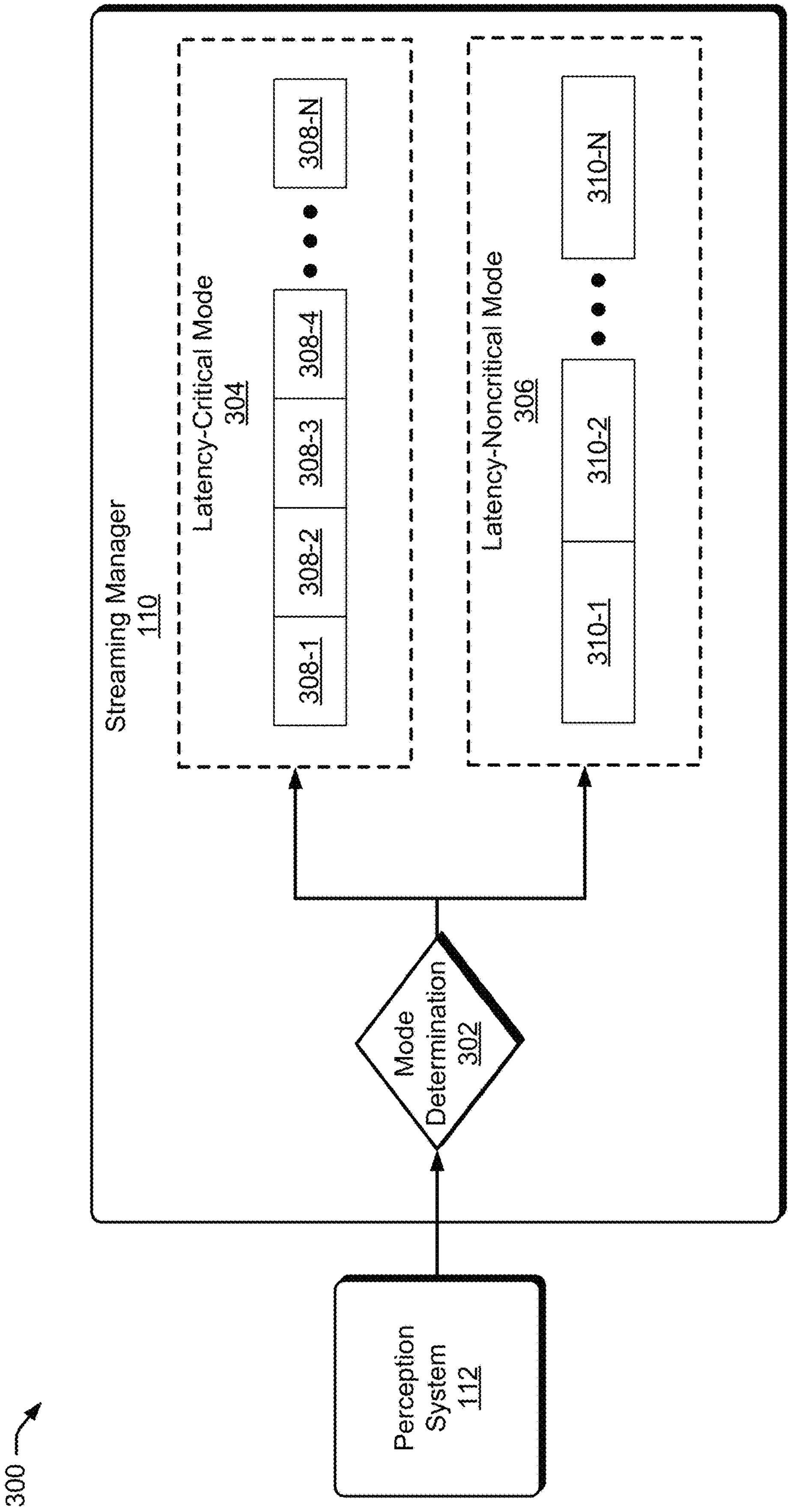
FIG. 3 illustrates a detailed example of aspects of batch size adjustment using latency-critical event recognition.

FIG. 3 illustrates a detailed example 300 of aspects of batch size adjustment using latency-critical event recognition. In the example 300, the perception system 112 inputs events to the streaming manager 110. In aspects, the streaming manager 110 includes a mode determination 302 where the appropriate upload mode in determined. The streaming manager 110, as illustrated, includes two modes: a latency-critical mode 304 and a latency-noncritical mode 306. Each of the modes defines a corresponding batch size, which is used to produce packets for streaming. For example, in the latency-critical mode 304, the images are organized into packets 308 (e.g., packet 308-1, packet 308-2, packet 308-3, packet 308-4, and packet 308-N) having a corresponding batch size. In aspects, the batch size defined for the latency-critical mode 304 is smaller than the batch size for the latency-noncritical mode 306.

In some implementations, the packets 308 in the latency-critical mode 304 have a batch size equal to the frame rate of the images. For example, each packet contains a single image. In other implementations, the packets 308 have a small batch size (e.g., less than or equal to 200 ms). In the latency-noncritical mode 306, the packets 310 (e.g., packet 310-1, packet 310-2, and packet 310-N) have a larger batch size than the packets 308 of the latency-critical mode 304. As a nonlimiting example, the packets 310 may have a batch size greater than 200 ms.

When images are received by the streaming manager 110, a mode is determined at the mode determination 302 based on data output by the perception system 112. For example, the mode determination 302 may compare the event likelihood output from the perception system 112 to a predetermined event likelihood threshold. If the event likelihood is greater than or equal to the event likelihood threshold, the images may be uploaded using the latency-critical mode 304. Alternatively, if the event likelihood is less than the event likelihood threshold, the images may be uploaded using the latency-noncritical mode 306. In aspects, the images are uploaded temporally. For example, a packet (e.g., packets 308 or packets 310) is uploaded when the packet reaches a corresponding batch size or when the next packet arrives. For example, in the latency-critical mode 304, one or more first images of the stream of images are maintained in the packet 308-1. When the packet 308-1 reaches the corresponding batch size, the packet 308-1 may be uploaded and one or more subsequent images are stored in the packet 308-2. When the packet 308-2 reaches the corresponding batch size, the packet 308-2 is uploaded and the next images are maintained in the packet 308-3. This process may continue until images are no longer provided to the streaming manager or until the mode is changed. The latency-noncritical mode 306 operates similarly. In the latency-noncritical mode 306, one or more first images are maintained in the packet 310-1 until the packet 310-1 reaches the appropriate batch size. At that point, the packet 310-1 may be uploaded and one or more subsequent images may be maintained in the packet 310-2. This process may continue until no more images are provided to the streaming manager 110 or until the mode is changed.

Example Methods

Figure 4:
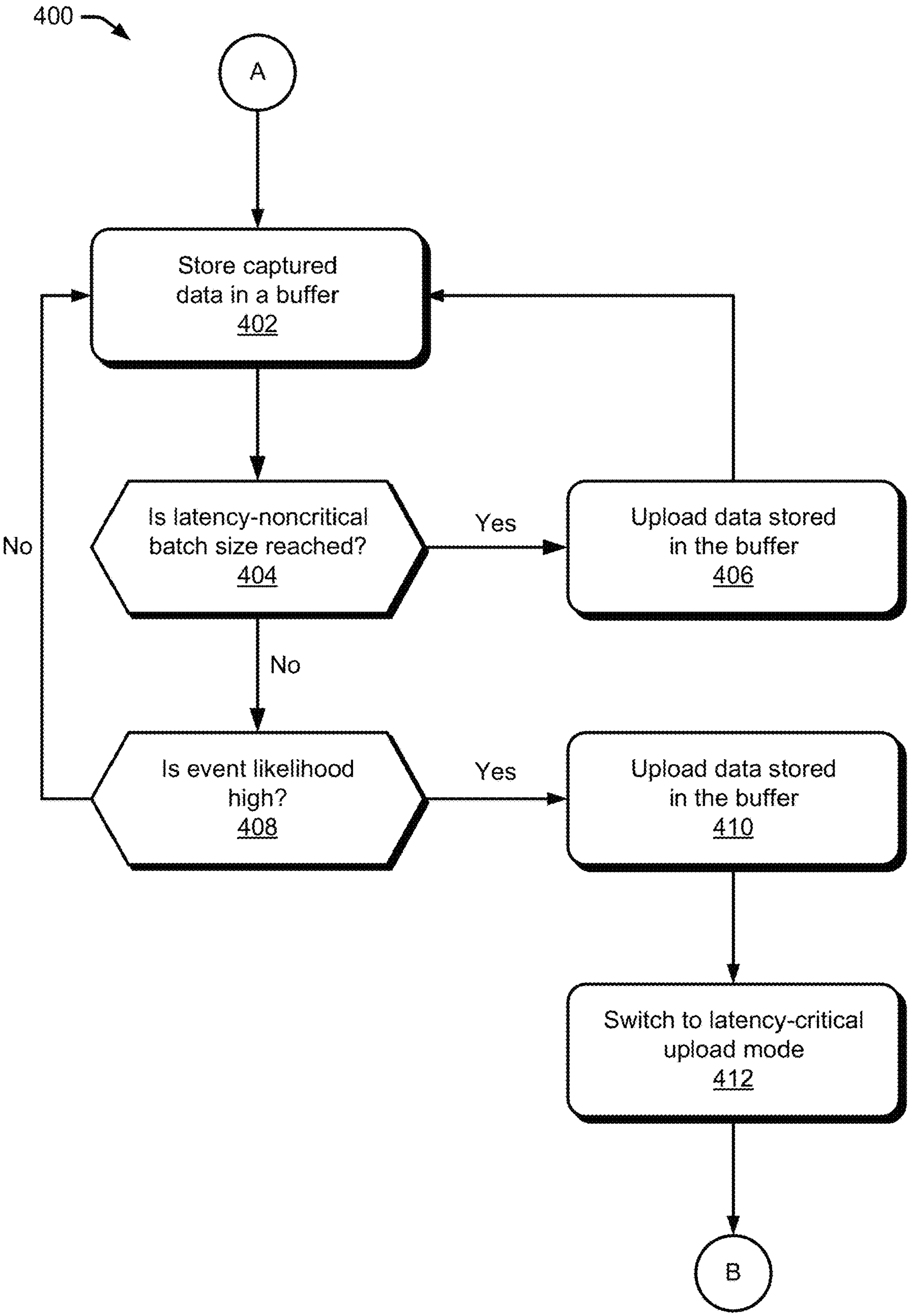
FIG. 4 illustrates an example method of switching from a latency-noncritical mode to a latency-critical mode in accordance with batch size adjustment using latency-critical event recognition.

FIG. 4 illustrates an example method 400 of switching from a latency-noncritical mode to a latency-critical mode in accordance with batch size adjustment using latency-critical event recognition. Methods are illustrated as a set of blocks that specify operations that may be performed but are not necessarily limited to the order or combinations shown for performing the operations by the respective blocks. Further, any of one or more of the operations may be repeated, combined, reorganized, or linked to provide a wide array of additional and/or alternate methods. The techniques are not limited to performance by one entity or multiple entities operating on one device. For clarity, the method is described with reference to the elements of FIGS. 1-3.

The method 400 begins in the latency-noncritical mode. As data are captured using the sensor, the captured data are stored in a buffer at 402. At 404, it is determined if the size of the buffer has reached the batch size associated with the latency-noncritical mode. If the latency-noncritical batch size is reached ("YES" at 404), the data stored in the buffer are uploaded to the network at 406. The process then returns to 402 by storing the next captured image in the cleared buffer. If the latency-noncritical batch size is not reached ("NO" at 404), the event likelihood is compared at 408. If the event likelihood is low ("NO" at 408) (e.g., the event likelihood is below the predetermined event likelihood threshold), the next image captured is stored in the buffer and the process repeats at 402.

If the event likelihood is high ("YES" at 408), however, the method 400 continues at 410 where the data stored in the buffer are uploaded to the network. In aspects, this is done as part of switching from the latency-noncritical mode to the latency-critical mode at 412. For example, to stream the subsequent data captured by the electronic device, the data currently maintained in the buffer may be uploaded immediately. Specifically, the more data in the buffer, the greater the latency to stream the subsequent data that have indicated a high likelihood of latency-critical events. As such, when a switch is triggered from the latency-noncritical mode to the latency-critical mode, the data maintained in the buffer may be uploaded, even when the latency-noncritical batch size is not yet met. In a worst-case scenario, the buffer has almost reached the latency-noncritical batch size. In an example, the latency-noncritical batch size is 30 seconds and the buffer has maintained data for 29.99 seconds. In this case, with a WiFi bandwidth of 4.3 megabits per second (Mbps), the corresponding latency is approximately 6.97 seconds. A large latency-noncritical batch size such as this example, however, produces a highly efficient WiFi duty cycle (e.g., the percentage of time the chip is in the active state). For example, with a batch size of 30 seconds, the WiFi duty cycle may be 23.9%. Thus, the chip may utilize less power and produce less heat. It should be appreciated that the latency-noncritical batch size and/or the WiFi bandwidth may change in different scenarios. For example, to reduce the worst-case latency, it may be ensured that the latency-noncritical batch size is no greater than two seconds. In another example, the latency-noncritical batch size may be no greater than three seconds. The WiFi duty cycle and worst-case latency are shown in the table below with respect to latency-noncritical batch size.

TABLE 1

Effect of latency-noncritical batch size on WiFi duty cycle and worst-case latency

| Latency-Noncritical Batch Size | WiFi Duty Cycle | Worst-Case Latency |
|---|---|---|
| <=200 milliseconds (ms) | 100% | 0 s |
| 500 ms | 62.8% | 0.11 s |
| 1 second (s) | 43.0% | 0.23 s |
| 2 s | 33.1% | 0.46 s |
| 3 s | 29.8% | 0.70 s |
| 5 s | 27.2% | 1.16 s |
| 10 s | 25.2% | 2.32 s |
| 15 s | 24.6% | 3.49 s |
| 30 s | 23.9% | 6.97 s |

In aspects, a latency-noncritical batch size may be chosen that prioritizes WiFi duty cycle or worst-case latency. For example, in instances where decreased latency is most important, a lower batch size that produces a higher WiFi duty cycle, but a lower worst-case latency, may be used. In other instances where power and heat generation are most important, a larger batch size may be used that produces a lower WiFi duty cycle but a higher worst-case latency. It should be noted that the latency-noncritical batch size may be any number of values including those detailed in Table 1 above and others. Moreover, the latency-noncritical batch size may be different for different implementations based on the tradeoffs described herein. In some instances it is seen that the benefits to WiFi duty cycle begin to level with latency-noncritical batch sizes of five or more seconds, while batch size changes from 200 milliseconds to five seconds produce greater decreases to WiFi duty cycle. As a result, a latency-noncritical batch size may be selected that is less than 5 seconds. Worst-case latency, however, may operate as a linear relationship with a latency-noncritical batch size. As a result, minimizing the latency-critical batch size may also minimize the worst-case latency. In some implementations, it may be determined that the worst-case latency cannot go beyond a certain value. As a nonlimiting example, the latency-noncritical batch size may be determined such that the worst-case latency is no greater than two seconds. In general, a larger batch size utilizes more WiFi bandwidth. As such, the batch size may be limited to prevent the upload from utilizing the entire WiFi bandwidth. After switching to the latency-critical mode at 412, the method 400 proceeds to "B," which leads to FIG. 5.

Figure 5:
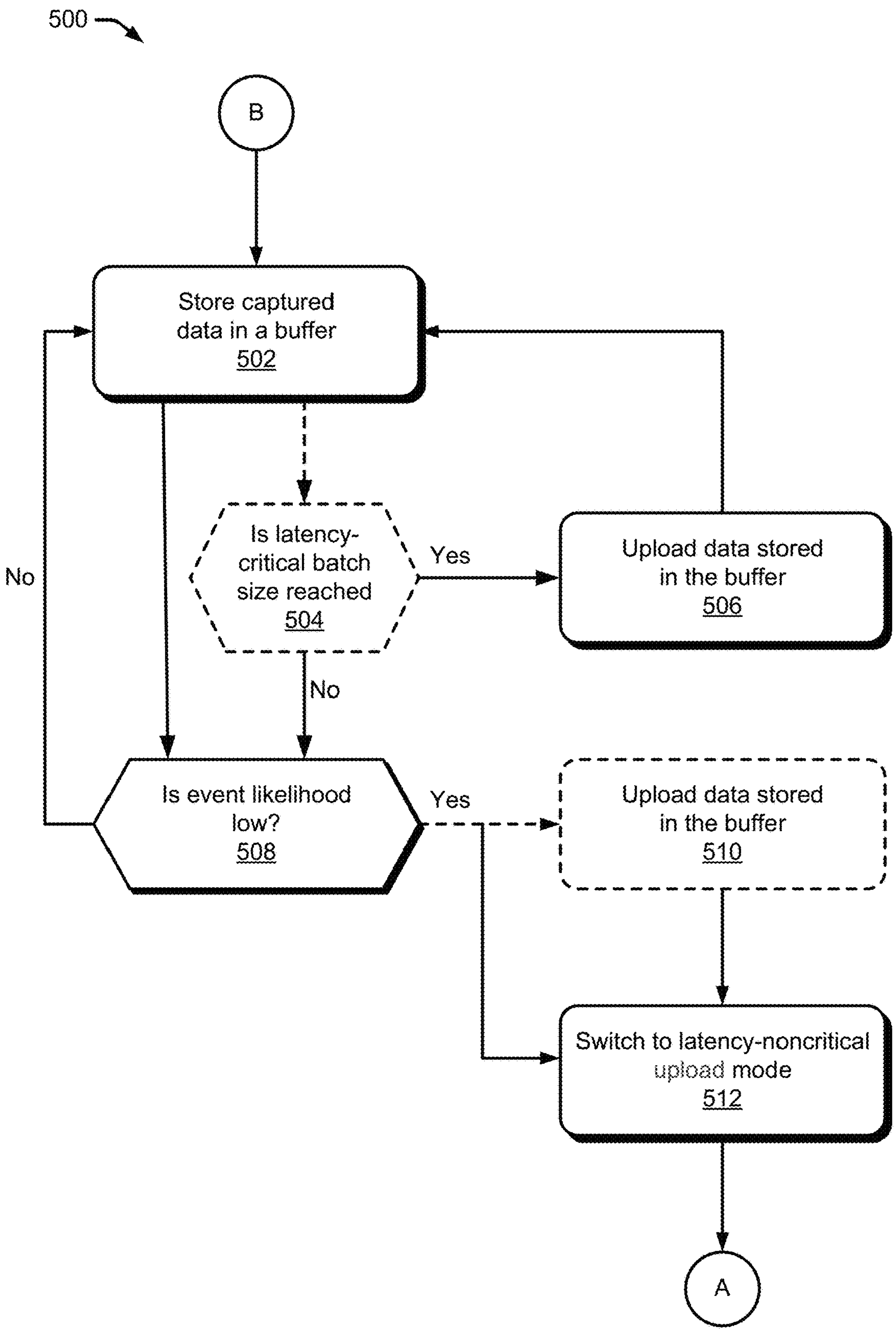
FIG. 5 illustrates an example method of switching from a latency-critical mode to a latency-noncritical mode in accordance with batch size adjustment using latency-critical event recognition.

FIG. 5 illustrates an example method 500 of switching from a latency-critical mode to a latency-noncritical mode in accordance with batch size adjustment using a latency-critical event recognition. The method 500 begins in the latency-critical mode and in some instances may continue from "B" in FIG. 4.

At 502, data captured by the sensor are stored in the buffer. In some instances, the batch size in the latency-critical mode is the size of a single frame, for example, the frame rate. In this instance, the content in the buffer may be uploaded after each frame capture. If the latency-critical batch size is not the size of one frame, however, it is determined whether the buffer has reached the size of the latency-critical batch size at 504. If the latency-critical batch size is reached ("YES" at 504), the data maintained in the buffer may be uploaded at 506, and the process may continue at 502 by storing the next data in the buffer, which may be cleared or written over after each upload. If the latency-critical batch size is not reached ("NO" at 504), however, it may be determined whether the event likelihood is below a predetermined event likelihood threshold at 508. If the event likelihood is not below the event likelihood threshold ("NO" at 508), the next data may be stored in the buffer and the process may return to 502 to repeat the method 500.

If the event likelihood is below a predetermined event threshold ("YES" at 508) and therefore the latency-noncritical mode is appropriate, the process may continue in multiple ways. Optionally, the data stored in the buffer may be uploaded to the network at 510 and the mode may be switched from a latency-critical mode to a latency-noncritical mode at 512. In other implementations, the data maintained in the buffer may not be uploaded to the network with the current batch size. Specifically, in the latency-noncritical mode, decreasing latency may not be as important as in the latency-critical mode. As such, the latency-noncritical batch size may be larger than the latency-critical batch size. Therefore, the data in the buffer may not need to be uploaded immediately when switching from latency-critical mode to latency-noncritical mode. Instead, the mode may be switched from latency-critical mode to latency-noncritical mode at 512, and the method may proceed to "A," which leads to FIG. 4 where the next data may be stored in the buffer. Moreover, subsequent data may be stored in the buffer until the latency-noncritical batch size is reached in accordance with the latency-noncritical mode. It should be noted that the operations described in FIG. 4 and FIG. 5 may be performed in other orders and operations may be added or omitted without extending beyond the scope of the present disclosure.

Figure 6:
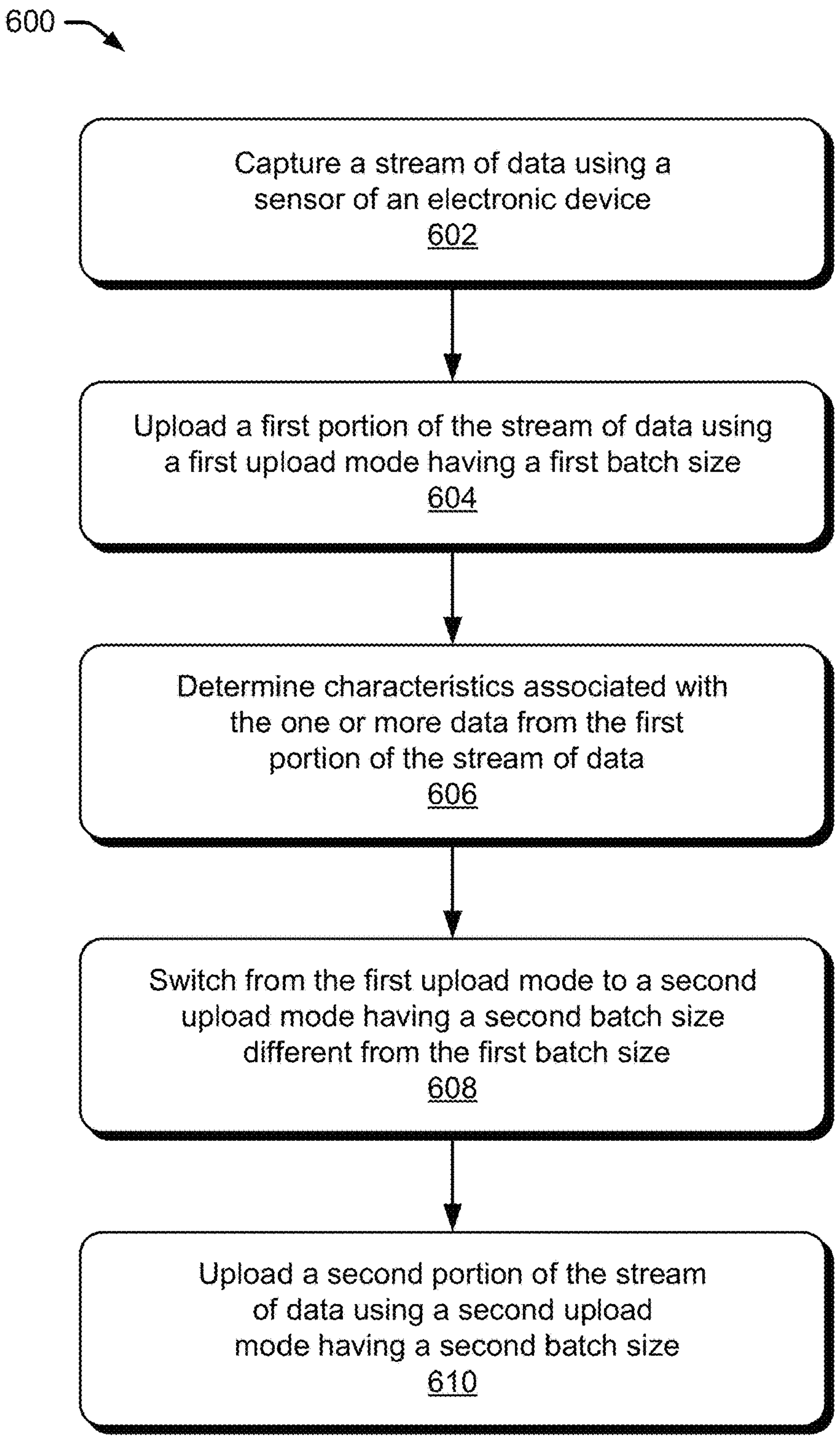
FIG. 6 illustrates an example method for batch size adjustment using latency-critical event recognition.

FIG. 6 depicts an example method 600 for batch size adjustment using latency-critical event recognition in accordance with one or more aspects.

At 602, a stream of data is captured using a sensor (e.g., sensor 108) of an electronic device 102. The sensor may be any number of appropriate sensors 108 as described herein in FIG. 1. In aspects, the stream of data may be captured in a sequential manner. The stream of data may be separated into one or more portions that are sent as packets having a particular batch size. In general, the batch size may vary based on the upload mode.

At 604, a first portion of the stream of data is uploaded to the network 116 using a first upload mode having a first batch size. For example, it may be determined by the perception system 112 that there is a low likelihood of latency-critical events in the first portion of data. As a result, the first portion of the stream of data are uploaded using a latency-noncritical mode. In the latency-noncritical mode, the packets may be uploaded with a larger batch size compared to the latency-critical mode. In other implementations, the first portion of the stream of data is determined to have a high likelihood of latency-critical events, and the first portion of the stream of data is uploaded using the latency-critical mode.

At 606, characteristics associated with the one or more data in the first portion of the stream of data are determined. For example, the characteristics may include motion, facial identification, person identification, object identification, audio detections, or any other suitable characteristic of a stream of data. In addition, the characteristics associated with the one or more data may include determining an event likelihood. In some instances, the event likelihood may be based on sensor data collected from a different sensor device communicatively coupled to the electronic device 102, for example, as a part of a smart home system. In aspects, the characteristics associated with the one or more data from the first portion of the stream of data may be used to determine the likelihood of latency-critical events in subsequent data, for example, a second portion of data from the stream of data. In this manner, the perception system 112 may provide data to the streaming manager 110 that enables the streaming manager 110 to operate in a proper mode during the subsequent data. For example, the first portion of the stream of data may be uploaded using the latency-noncritical upload mode, and the second portion of data may need to be uploaded using the latency-critical mode. In another example, the first portion of the stream of data may be uploaded in the latency-critical mode, while the second portion from the stream of data may be uploaded in the latency-noncritical mode.

At 608, in response to determining characteristics associated with the one or more data from the first portion of the stream of data, the streaming manager 110 switches from the first upload mode to the second upload mode. In some implementations, determining the characteristics associated with the one or more data from the first portion occurs at a time when the buffer maintaining the first portion of data has not yet reached the appropriate batch size. For example, the characteristics associated with the one or more data may indicate that the streaming manager 110 may switch from a latency-noncritical upload mode to a latency critical upload mode, for example, when the event likelihood is greater than or equal to an event likelihood threshold. In these implementations, the data maintained in the buffer having a current batch size less than the appropriate batch size (e.g., the latency-noncritical batch size) may be uploaded with the current batch size to "flush" the buffer. In this manner, the latency when uploading the subsequent data may be reduced.

In another example however, the streaming manager 110 may switch from the latency-critical mode to a latency-noncritical mode, for example, when the event likelihood is less than an event likelihood threshold. In this example, the switching operations may be more relaxed. For example, in general, the latency-noncritical mode may have a larger batch size than the latency-critical mode. As a result, when the streaming manager 110 switches from the latency-critical mode to the latency-noncritical mode, increase latency may be used for the upload. For example, the streaming manager 110 may upload the buffer that maintains the first portion of the stream of data even though it has not yet reached the corresponding batch size (e.g., the latency-critical batch size), or the buffer may be maintained and subsequent data may be appended in the buffer until the corresponding batch size is reached in accordance with the new upload mode (e.g., the latency-noncritical batch size).

At 610, the second portion of the stream of data is uploaded to the network 116 using the second upload mode having the second batch size. For example, the second upload mode may be the latency-critical or the latency-noncritical upload mode. In the latency-critical upload mode, the latency may be reduced so that a user device 118 streaming the stream of data may view the data in near real-time. In aspects, the latency-critical mode is used when there is a high likelihood that a latency-critical event is occurring in the data. In the latency-noncritical mode, the WiFi duty cycle may be reduced so that the WiFi chip may operate in the active state for less time. As a result, the power consumption of the WiFi chip and overall heat generation may be reduced. In aspects, the latency-noncritical mode may increase the overall WiFi efficiency. In general, the latency-noncritical mode is used when there is a low likelihood that the stream of data involve a latency-critical event. By providing real-time batch size adjustment using latency-critical event recognition, electronic devices may optimize power consumption, heat generation, and latency based on characteristics of the one or more data being uploaded to the network. In doing so, the electronic device may provide secure and computationally less-expensive video monitoring of an area that results in optimal user satisfaction.

Conclusion

Although aspects of batch size adjustment using latency-critical event recognition have been described in language specific to features and/or methods, the subject of the appended claims is not necessarily limited to the specific features or methods described. Rather, the specific features and methods are disclosed as example implementations of the claimed batch size adjustment using latency-critical event recognition, and other equivalent features and methods are intended to be within the scope of the appended claims. Further, various aspects are described, and it is to be appreciated that each described aspect can be implemented independently or in connection with one or more other described aspects.

What is claimed is:

1. A method, comprising:

capturing, by a sensor of an electronic device, a stream of data;

transitioning a WiFi component of the electronic device from a sleep state to an active state, the sleep state defining a duration for which the WiFi component is idle and the active state defining a duration for which the WiFi component is operational;

responsive to the transition from the sleep state to the active state, uploading, to a network via the WiFi component, a first portion of the stream of data using a first upload mode having a first batch size;

determining characteristics associated with the data from the first portion of the stream of data;

in response to determining characteristics associated with the data from the first portion of the stream of data, switching from the first upload mode to a second upload mode having a second batch size different from the first batch size, the switching from the first upload mode to the second upload mode effective to alter the duration for which the Wifi component is idle; and after switching to the second upload mode, uploading, to the network via the WiFi component, a second portion of the stream of data using the second upload mode.

2. The method of claim 1, wherein determining the characteristics associated with the data comprises:

determining an event likelihood based on at least one of:

a determination of an amount of motion within the data from the first portion of the stream of data;

an identification of a face within the data from the first portion of the stream of data; or an identification of an object within the data from the first portion of the stream of data.

3. The method of claim 2, wherein:

the event likelihood is determined to be a high event likelihood based on the event likelihood being greater than a predetermined event likelihood threshold; and the first batch size is larger than the second batch size.

4. The method of claim 3, wherein:

the event likelihood is determined when a current batch size of a buffer containing the first portion of the stream of data is less than the first batch size; and switching from the first upload mode to the second upload mode comprises:

in response to determining that the event likelihood of the data is a high event likelihood, uploading the first portion of the stream of data from the buffer using the current batch size.

5. The method of claim 3, wherein:

the first batch size is greater than 200 milliseconds; and the second batch size is less than or equal to 200 milliseconds.

6. The method of claim 2, wherein:

the event likelihood is determined to be a low event likelihood less than a predetermined event likelihood threshold; and the second batch size is larger than the first batch size.

7. The method of claim 2, further comprising receiving sensor data from a different sensor device communicatively coupled to the camera device, wherein the determining of the event likelihood is further based on the sensor data from the different sensor device.

8. The method of claim 1, wherein the second portion of data is subsequent to the first portion of data in the stream of data.

9. The method of claim 1, wherein:

uploading, to the network, the first portion of the stream of data using the first upload mode comprises:

maintaining the first portion of the stream of data in a buffer until the buffer reaches the first batch size; and in response to the buffer reaching the first batch size, uploading the first portion of the stream of data maintained in the buffer; and uploading, to the network, the second portion of the stream of data using the second upload mode comprises:

maintaining the second portion of the stream of data in the buffer until the buffer reaches the second batch size; and in response to the buffer reaching the second batch size, uploading the second portion of the stream of data maintained in the buffer.

10. An electronic device comprising:

a sensor;

a WiFi component;

at least one processor; and non-transitory computer-readable storage media storing computer-executable instruction that, when executed by the at least one processor, cause the at least one processor to:

capture, using the sensor of the electronic device, a stream of data;

transition the WiFi component from a sleep state to an active state, the sleep state defining a duration for which the WiFi component is idle and the active state defining a duration for the WiFi component is operational;

responsive to the transition from the sleep state to the active state, upload, to a network via the WiFi component, a first portion of the stream of data using a first upload mode having a first batch size;

determine characteristics associated with the data from the first portion of the stream of data;

in response to determining characteristics associated with the data from the first portion of the stream of data, switch from the first upload mode to a second upload mode having a second batch size different from the first batch size, the switching from the first upload mode to the second upload mode effective to alter the duration for which the WiFi component is idle; and after switching to the second upload mode, upload, to the network via the WiFi component, a second portion of the stream of data using the second upload mode.

11. The electronic device of claim 10, wherein the characteristics associated with the data comprise:

an event likelihood based on at least one of:

a determination of an amount of motion within the data from the first portion of the stream of data;

an identification of a face within the data from the first portion of the stream of data; or an identification of an object within the data from the first portion of the stream of data.

12. The electronic device of claim 11, wherein:

the event likelihood is determined to be a high event likelihood based on the event likelihood being greater than a predetermined event likelihood threshold; and the first batch size is larger than the second batch size.

13. The electronic device of claim 12, wherein:

the event likelihood is determined at a same time that a current batch size of a buffer containing the first portion of the stream of data is less than the first batch size; and switching from the first upload mode to the second upload mode comprises:

in response to determining that the event likelihood of the data is a high event likelihood, uploading the first portion of the stream of data from the buffer using the current batch size.

14. The electronic device of claim 12, wherein:

the first batch size is greater than 200 milliseconds; and the second batch size is less than or equal to 200 milliseconds.

15. The electronic device of claim 11, wherein:

the event likelihood is determined to be a low event likelihood less than a predetermined event likelihood threshold; and the second batch size is larger than the first batch size.

16. The electronic device of claim 11, wherein:

the processor is further configured to receive sensor data from a different sensor device communicatively coupled to the electronic device; and the determining of the event likelihood is further based on the sensor data from the different sensor device.

17. The electronic device of claim 16, wherein the electronic device and the sensor device are associated with a smart home system.

18. The electronic device of claim 10, wherein the electronic device is one of:

an indoor security camera;

an outdoor security camera; or a doorbell camera.

19. The electronic device of claim 10, wherein the second portion of data is subsequent to the first portion of data in the stream of data.

20. The electronic device of claim 10, wherein:

the processor, in accordance with the first upload mode, is further configured to:

maintain the first portion of the stream of data in a buffer until the buffer reaches the first batch size; and in response to the buffer reaching the first batch size, upload the first portion of the stream of data maintained in the buffer; and the processor, in accordance with the second upload mode, is further configured to:

maintain the second portion of the stream of data in the buffer until the buffer reaches the second batch size; and in response to the buffer reaching the second batch size, upload the second portion of the stream of data maintained in the buffer.

* * * * *